FURLONG & LEAVITT.
Weighing Apparatus.
No. 26,757.
Patented Jan'y 10, 1860.
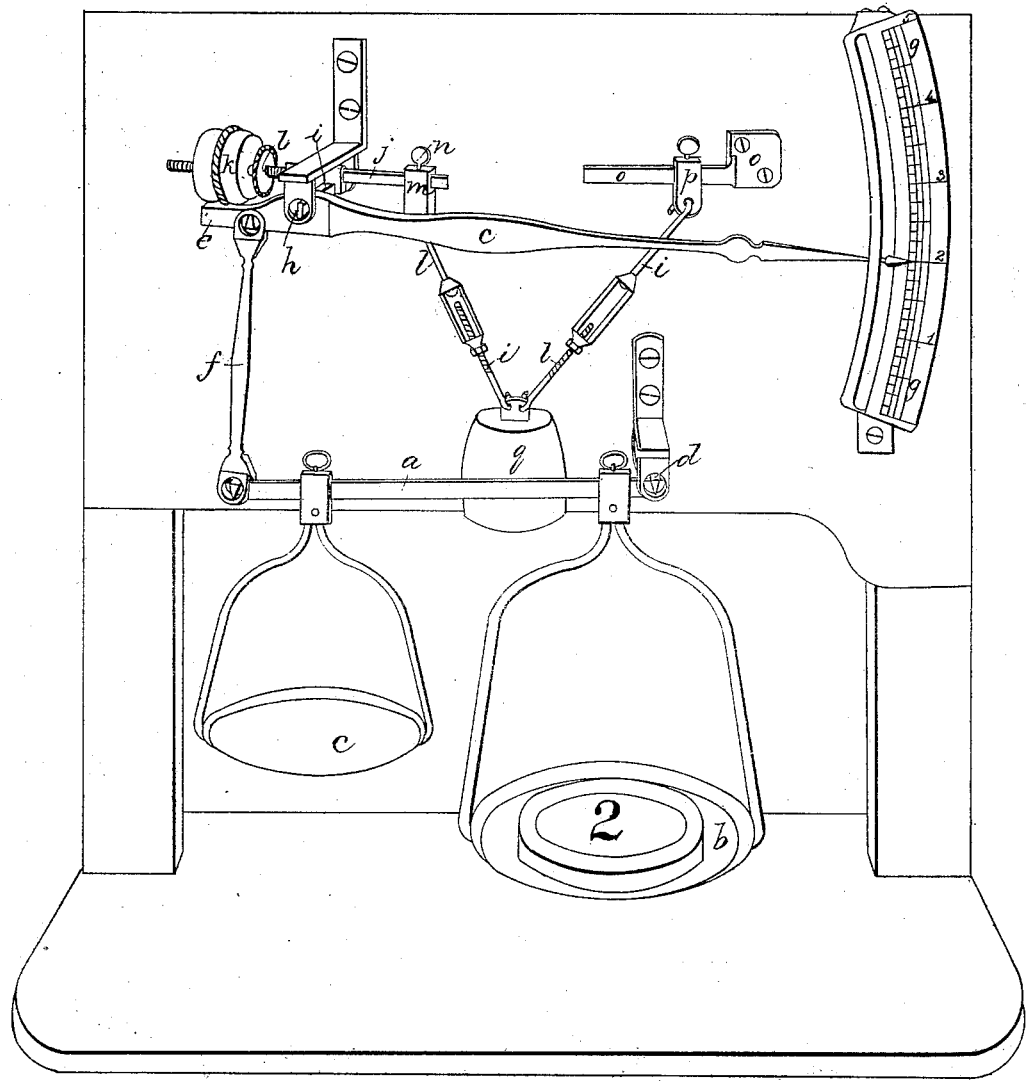

UNITED STATES PATENT OFFICE.

E. P. FURLONG, OF CHARLESTOWN, AND THOMAS LEAVITT, OF MALDEN, MASSACHUSETTS.

WEIGHING APPARATUS.

Specification of Letters Patent No. 26,757, dated January 10, 1860.

*To all whom it may concern:*

Be it known that we, E. P. FURLONG, of Charlestown, and THOMAS LEAVITT, of Malden, both in the county of Middlesex and State of Massachusetts, have invented a new and useful Improvement in Weighing Apparatus; and we do hereby declare that the following, taken in connection with the drawings which accompany and form part of this specification, is a description thereof so full and exact as to enable those skilled in the art to practice our invention.

The kind of apparatus to which our invention is applicable is that in which the weight of any article placed in the scale pan is indicated upon or by an index without the necessity of changing weights or of adjusting counterpoises by hand, or in other words our invention relates to automatically indicating weighing apparatus.

In the automatically indicating weighing apparatus commonly known as the bent lever balance, equal increments of weight do not move the index finger, which commonly is the end of the weighted lever, over equal linear portions of the index, which is necessarily therefore made in divisions of unequal length, by which confusion and error are apt to arise.

To produce a balance in which equal increments of weight shall move an index finger equal distances over a scale of equal parts, without extension or compression of a spring or springs, or requiring any manipulation of test weights or counterpoises, is the object of our invention, which we have embodied in the mechanism illustrated in the drawing referred to, and described below.

The lever ($a$), which supports the scale pans ($b$) and ($c$), is hung at ($d$) by the usual suspension edges employed for balances; ($e$) is connected to one end of the lever ($a$) by means of the link ($f$), the other end of the lever extending to the scale of equal parts ($g$) where it is fashioned into an index finger. A shaft is fixed to the lever ($e$) at or near its suspension edge ($h$), and to the other end of this shaft is fixed another suspension edge in the same line and plane with ($h$). To shaft ($i$) a lever ($j$) is fixed which bears upon one end an adjustable weight or counterpoise ($k$); this weight is placed in any desired position by turning it on the screw into which this arm of lever ($j$) is formed, a corresponding nut being made in the weight which, when properly adjusted, is held in place by the jam nut ($l$). The other end of lever ($j$) bears an adjustable piece ($m$), which may be adjusted by a set screw ($n$). A piece ($o$) is attached to some fixed point as shown in the drawing and bears a piece ($p$) similar to the adjustable piece ($m$) on the lever ($j$). Each of the adjustable pieces ($m$) and ($p$) is provided with an arrangement for suspending between and below them the constant weight ($v$) by means of the links ($r$). These links are provided with or are made of the well known swivel screw, by which, or any equivalent therefor, nice adjustment of the position of the weight ($q$) can be made after approximately determining its position by means of the adjustable pieces ($m$) and ($p$).

The points of suspension of the weight and links are best made by means of knife edges, and it may be said of this, as of all other lever balances, that nicety of workmanship, and employment of devices well known in the manufacture of weighing apparatus for the reduction of friction to a minimum, is repaid by greater sensibility of the apparatus. We account below for the fact that, in an apparatus constructed substantially in the manner with that described, equal increments of weight cause equal movements of the index finger, that is if one pound moves the finger one inch, two pounds move it two inches, three, and so on. As the lever ($a$) is depressed, by placing any substance in either scale pan ($b$) or ($c$), the index finger is raised, and the shaft ($i$) partially rotated, thereby raising the adjustable weight and bringing it nearer to the fulcrum of lever ($e$). If weight ($q$) was supported solely from the lever ($j$) then the usual result would follow the change of leverage of a constant weight as it moved with regard to the fulcrum of the lever upon which it acts. But as the weight is supported from two points the amount of weight borne by each is in inverse ratio to the distance from those points of a line drawn perpendicular to a line connecting the points of suspension of the weight, and through the center of gravity of the weight. Thus while the amount of the leverage of the weight is diminished by the depression of ($a$) the amount of the weight supported by ($j$) is increased, while its leverage is diminished in such a ratio as to cause the desired movement of the index finger for equal increments of weight.

After the index finger has been made to move, as herein before stated, it may be brought to the zero point, with nothing in the pans, by simply moving the counterpoise as desired. This is the only function of the counterpoise, as will be made to appear, after the balance is once adjusted, by moving the counterpoise so that when the scale pans are empty the finger shall indicate one or more pounds or fractions thereof, now place any weight in either pan and it will be found that the finger moves over the same linear distance that it would have done for the same weight when the scales were in their normal adjustment. The position of the pans may be so adjusted that a given weight would move the finger over a greater distance if placed in one pan than if placed in the other, an arrangement by which convenience of weighing heavy or light articles in the same balance is secured. The particular adjustment of parts, weight, and leverage shown in the drawings is such as will cause the finger to move from one of the long marks to another on the scale of equal parts for each pound placed in the larger pan, and correspondingly for fractional parts of pounds, while the movement of the finger will be one fourth as much for each half ounce placed in the small pan.

It will be evident that the arrangement of parts, weight, and leverage may be very much varied, so much so indeed that all resemblance in form, numbers, and proportion, to my invention as herein illustrated, will be lost; yet the gist of my invention will remain so long as a counterbalancing weight ($q$) operates on the matter to be weighed in the specified manner to indicate amount of weight by means of a moving finger and fixed index of equal parts, or with a fixed finger and a moving index of equal parts.

We claim—

The arrangement of the weight ($q$), operating substantially as set forth, in combination with a weighing mechanism for the purpose specified.

E. P. FURLONG.
THOMAS LEAVITT.

Witnesses:
I. B. CROSBY,
W. B. GLEASON.